United States Patent [19]

White et al.

[11] 3,798,548

[45] Mar. 19, 1974

[54] DISCRETE CABLE TELEVISION DISTRIBUTION SYSTEM

[75] Inventors: Paul White; Robert H. Wilson, both of Phoenix, Ariz.

[73] Assignee: Ameco, Inc., Phoenix, Ariz.

[22] Filed: Sept. 8, 1971

[21] Appl. No.: 178,693

[52] U.S. Cl. ............ 325/309, 178/DIG. 13, 325/33, 325/37, 325/53, 325/455, 325/464, 334/50, 334/86, 340/168 R

[51] Int. Cl. .......................................... H04b 1/06

[58] Field of Search ........... 325/308, 455, 464, 452, 325/462, 32, 33, 37, 53, 63, 309, 468; 178/DIG. 13, 5.1, 22; 340/168 R; 335/28, 106; 334/47, 85, 86, 88; 179/1.5

[56] References Cited

UNITED STATES PATENTS

| | | | |
|---|---|---|---|
| 3,706,040 | 12/1972 | Gargini | 325/308 |
| 3,491,714 | 1/1970 | King | 325/455 |
| 3,693,090 | 9/1972 | Gabriel | 325/308 |
| 3,423,521 | 1/1969 | Friesen et al. | 325/309 |
| 3,667,052 | 5/1972 | Effenberger | 325/452 |
| 3,639,840 | 2/1972 | Shekel et al. | 325/308 |

*Primary Examiner*—Robert L. Griffin
*Assistant Examiner*—Marc E. Bookbinder
*Attorney, Agent, or Firm*—LeBlanc & Shur

[57] ABSTRACT

Disclosed is a channel selection and synchronizing mechanism for a Cable Television Distribution System. The system employs a number of main distribution cables each carrying at most three programs within a single relatively low frequency band, and a number of area distribution centers (ADC's). A single communication path connects each subscriber station to one of the ADC's while switching circuitry controlled by the subscriber selectively connects the communication path to the desired one of the cables. Frequency conversion at the subscriber station shifts the incoming band to one of the clear local channels. The selector mechanism includes switching means for providing pulse signals over the communication path for channel selection and synchronization of the switching equipment. A channel selection display is provided by an indicia bearing loop which includes means for operating the synchronizing signal generator. For multiple programs on each distribution cable the selector includes switching means for actuating selective frequency conversion circuitry for converting incoming programs in different frequency transmission bands to the frequency of one of the locally unassigned standard channels.

24 Claims, 24 Drawing Figures

INVENTORS
PAUL WHITE
ROBERT H. WILSON

BY Le Blanc & Shur

ATTORNEYS

DISCRETE CABLE TELEVISION DISTRIBUTION SYSTEM

BACKGROUND

The present invention relates to a cable television distribution system in which several program channels are provided over a series of discrete distribution cables to one or more area distribution centers from which a single control and information path extends to each system subscriber. In particular, the invention relates to a subscriber station control and selector unit for use in such a system.

One type of cable television system in which the present invention is particularly useful is described and claimed in assignee's copending Merrill et al. U.S. Pat. application, Ser. No. 850,394, filed Aug. 15, 1969, now abandoned. However, the invention may find utility in other cable television or related systems in which a local station is connected to a central distribution station over a communication path to receive one of several locally selectable channels of program or other information.

As explained in the Merrill et al. application, direct, i.e., "off-the-air" reception of television programs can be subject to severe quality degradation resulting from multi-path radio wave propagation, shielding due to natural and man-made obstructions, etc. Cable television distribution systems have provided a helpful solution to such problems.

The above mentioned Merrill et al system represents an advanced utilization of cable television techniques to provide improved operating performance and expanded scope of facilities and services. Briefly stated, the Merrill et al. system utilizes a plurality of separate, i.e., discrete cables coupled between an antenna site and a plurality of area distribution centers (ADC's). A plurality of subscriber stations are associated with each ADC. A subscriber station is connected to its associated ADC by a single singnalling and control path.

At the antenna site, the off-the-air signals are converted from the incoming VHF and UHF to a single 7 to 13 MHz sub-channel with an 8.25 MHz video carrier and a 12.75 MHz aural carrier. The television programs are transmitted to the subscribers in the 7—13 MHz sub-channel and are locally up-converted by a fixed frequency heterodyne system to the frequency of one of the locally unused standard television channels.

In the Merrill et al. system, each subscriber station includes signalling means for selecting the desired channel of television program material directly over the RF subscriber line. In a preferred embodiment, operating current for the sub-channel to VHF converter is also provided over the subscriber line from the associated ADC.

Channel selection is accomplished by transmission of signal pluses to the ADC, where the pulses are processed by switching apparatus associated with the particular subscriber. To assure synchronism between the subscriber channel selection apparatus and the switching apparatus at the distribution center, synchronizing pulses are generated at certain intervals by the subscriber station equipment and transmitted to the distribution center where appropriate equipment senses the synchronizing signal and sets the switching apparatus to a predetermined switching state.

The cable television system described in the Merrill et al patent application possesses many significant advantages. First, the number of channels of available television program material is limited only by the number of discrete distribution cables, since only the single 6 MHz sub-channel is employed, irrespective of the number of channels. Because a separate distribution cable is employed for each channel, cross-talk and other cross-channel interference is totally eliminated. High-quality ghost-free reception may be attained, despite high off-the-air signal interference, and local utilization of seven (or even more) channels for off-the-air broadcast operations.

Moreover, the very large number of available channels facilitates provision of video communication between subscriber stations, as well as business services, visual monitoring, and other one and two-way communication. The system is flexible so that initial small scale operation can be expanded as desired to provide an increasingly broad scope of video and other communication services.

Even though cable television systems like that described above have many advantages, the cost of installation and operation of a new system must be competitive with other available but less versatile systems. Thus, every effort must be made in designing and selecting system components to assure the lowest possible cost consistent with high quality and reliability.

From the standpoint of reliability, the channel selector unit installed at the individual subscriber locations must be designed with particular care. The channel selector must perform a variety of functions, including remote channel selection, channel indication, synchronization of remote switching equipment, and subchannel to VHF conversion, and consequently is of somewhat complex construction. Unfortunately, this portion of the system is also the one most likely to be subjected to careless use by subscribers, and particularly by their children, and therefore low cost and high reliability present conflicting demands. Yet high reliability of the equipment at the subscriber location is particularly important since immediate service or parts replacement in case of failure may not be available rendering the system useless to the subscriber for an extended period of time.

A suitable subscriber station control and selector unit must therefore provide the required operating functions in a unit which is both low in cost and highly durable and reliable.

A variety of constructions of capable having the required functions have been considered, but most have been found to be unsatisfactory either due to limited long term reliability or unrealistically high cost.

BRIEF DESCRIPTION OF INVENTION

The foregoing requirements are met in accordance with the present invention by provision of a subscriber station control unit comprised of a channel selector mechanism, a channel identification display, a reset synchronization mechanism and a sub-channel to VHF converter. The channel selection mechanism includes a manually operated selector wheel having a set of peripheral cam segments. The latter engage with the follower spring arm of a microswitch arranged to provide a momentarily opened circuit to generate a channel advance pulse to the ADC each time the spring arm passes a predetermined portion of the cam segment geometry. The selector wheel is constructed to provide a detent corresponding with each change in cam segment geometry whereby channel selection is on a discrete rather than a continuous basis.

The channel identification display is provided by a continuous indicia bearing display loop. A drive mechanism for the display loop is mechanically coupled with the selector wheel. Operation of the channel selection signal generator is synchronized with the advance of the display loop so that a channel advance pulse is generated each time another one of the channel identification indicia is advanced into display position.

The number of indicia on the display loop may be substantially larger than the number of cam segments on the selector wheel. The wheel may therefore make several revolutions (the last of which may not even be complete) for each cycle of the display loop. Such independence of the drive and display mechanisms facilitates modification of the selector mechanism to accommodate a larger number of available channels in a simple and convenient manner, i.e., by substituting a longer display loop. Nothing else is necessary since the area distribution center counts the advance pulses which are correlated with complete display loop cycles rather than with selector wheel cycles.

Since channel selection is on a sequential (as distinguished from random access) basis, re-synchronization between the subscriber station control unit and the remote distribution station is conveniently done on a "once per display loop cycle" basis. In accordance with the present invention, this is accomplished by employment of a second microswitch cooperating with a portion of the display loop itself to produce a reset synchronization signal as the display loop is advanced to place the indicium corresponding to the first channel in display position.

The sub-channel to VHF converter is a solid state circuit of suitable construction and design, preferably in integrated or hybrid form and is located within the housing of the subscriber station control unit. The housing is so constructed as to provide adequate shielding for high frequency operation without sacrificing simplicity of construction and at a realistically low cost.

As mentioned above, in the system of the Merrill et al patent application, each of the discrete distribution cables carries a single television program within the 7–13 MHz sub-band. Consequently, operation of the selector mechanism results in a transmission of only a single television program over the communication band from the area distribution center to the subscriber station. However, by simultaneous transmission of more than one program over a single distribution cable, for example, up to three channels in respective 6 MHz bands, it is possible to increase the number of available programs without increasing the number of discrete distribution cables required. By limiting the number of channels per cable to three or less, all of the advantages of high quality reproduction inherent in discrete cable transmission are retained.

For such a system, however, up to three different 6 MHz sub-channels are employed, and provision must be made for selectable conversion of each of the sub-channels to the VHF frequency corresponding to the locally clear channel on which the television program is actually displayed.

In accordance with the invention, this is accomplished by providing an additional microswitch having an arm engaging as a follower with a second set of cams on the selector wheel and arranged to operate the microswitch to select the proper local oscillator frequency for each incoming channel.

Accordingly, it is an object of this invention to provide an improved subscriber station control unit for a cable television distribution system.

It is a further object of this invention to provide a subscriber station control unit which has high long-term reliability and durability, and is capable of withstanding careless use, abuse by children or other hazards inherent in use of the device on a casual basis by preoccupied and/or untrained persons.

It is a related object of this invention to provide a subscriber station control unit as described above which can be manufactured at low cost without sacrifice of reliability and durability.

It is another object of this invention to provide a subscriber station control unit which generates a channel selection signal for each channel available in the system and provides a visual indication of the selected system.

It is a related object of this invention to provide a subscriber station control unit capable of generating reset synchronization signals at selected intervals for transmission to an area distribution center to assure synchronism between the subscriber station channel selector equipment and the associated equipment at the area distribution center.

It is another object of this invention to provide a subscriber station control unit including a manually operated sequential channel selector mechanism comprising a selector wheel having a plurality of cam segments, and a microswitch arranged to be momentarily opened as the follower spring arm thereof passes a predetermined portion of each cam segment, thereby to generate a channel selection pulse for each such segment.

It is a related object of this invention to provide a subscriber station control unit including a channel display mechanism comprised of a continuous loop of indicia bearing material and synchronization signal generating means operated by the display loop to provide a reset synchronization signal as the indicium for the first available program channel is advanced into display position.

It is a further related object of this invention to provide a subscriber station control unit in which the number of indicia on the display loop exceeds the number of cam segments on the selector wheel by any desired amount.

Another object of this invention is to provide a subscriber station control unit as described above including a frequency converter for transforming the frequency band of an incoming channel of television program material to one of the standard VHF channels which is unassigned in the area in which the system is being used.

Another object of this invention is to provide a subscriber station control unit in which the frequency converter includes means for generating more than one local oscillator frequency and in which the selector mechanism includes switching means for selecting one of the local oscillator frequencies to be employed.

The exact nature of the invention as well as other objects and advantages thereof will become apparent from consideration of the following detailed description and the accompanying drawing in which.

Figure 2:
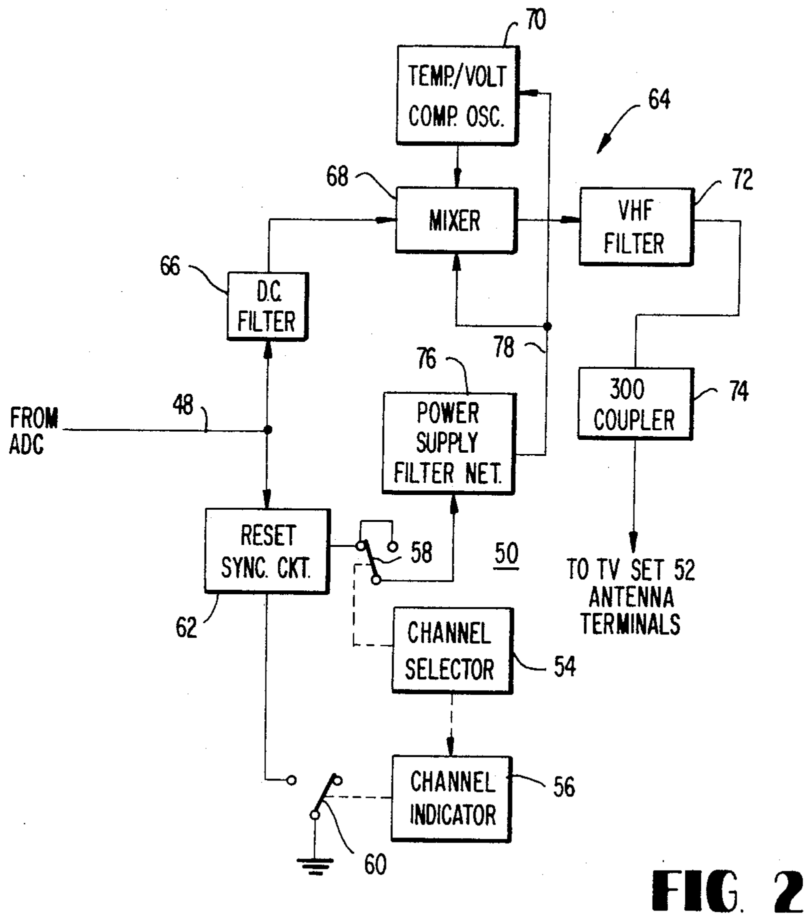
FIG. 2 is a detailed block diagram of the subscriber station control unit of the present invention.
Figure 3A:
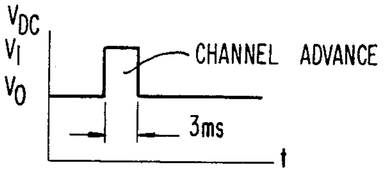
Figure 3B:
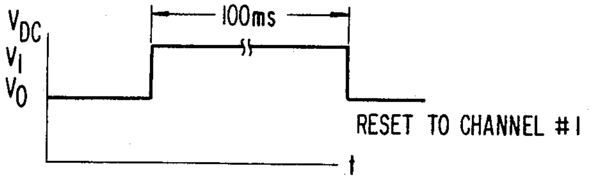
Figure 4:
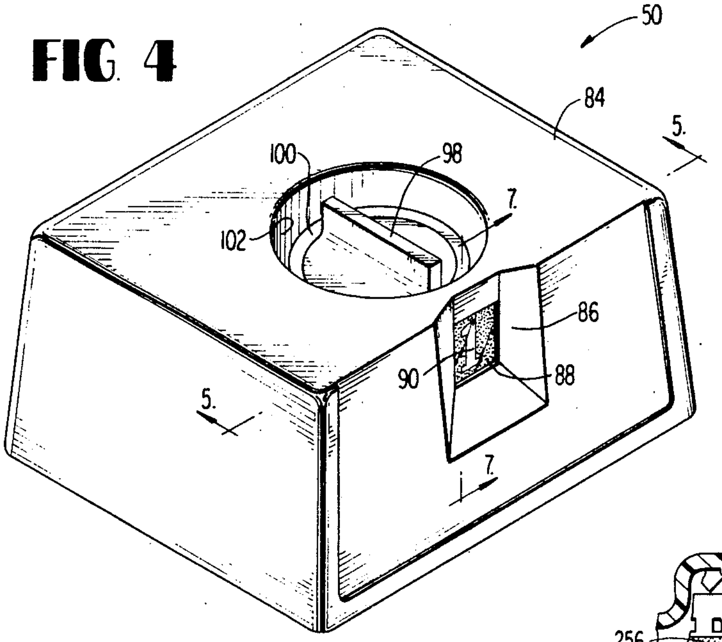
Figure 6:
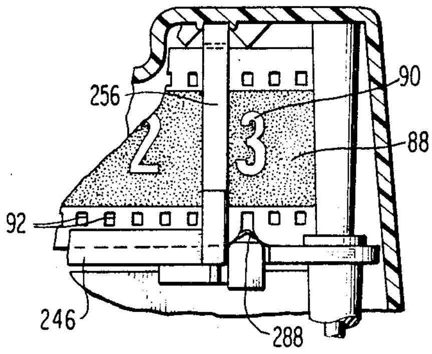
Figure 7:
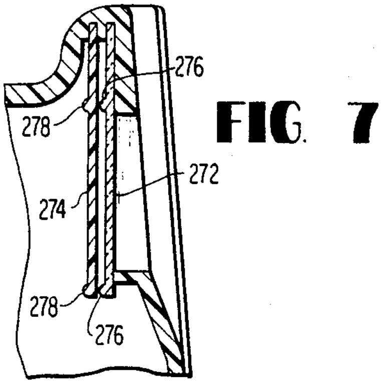
Figure 5:
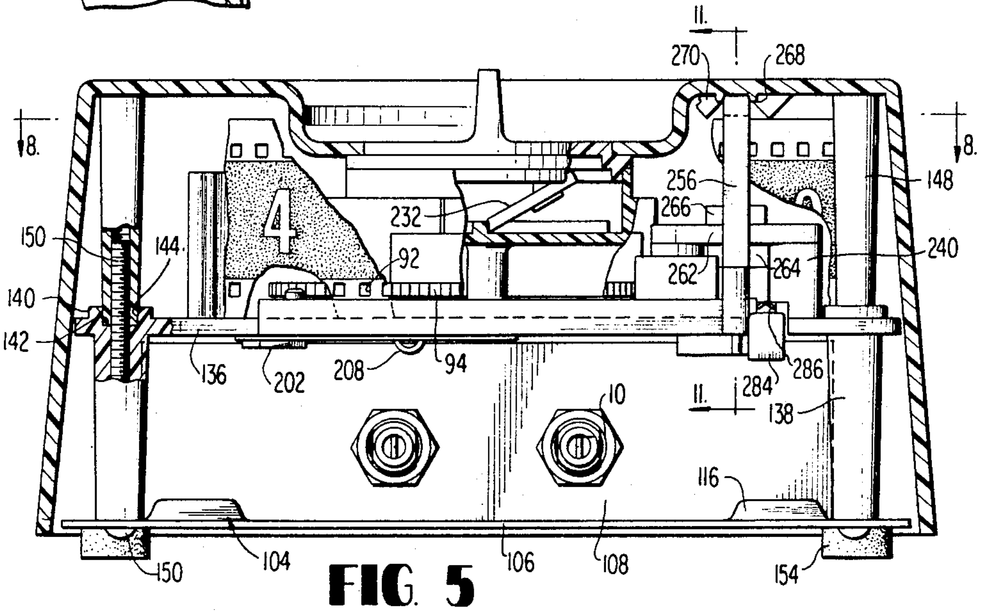
Figure 8:
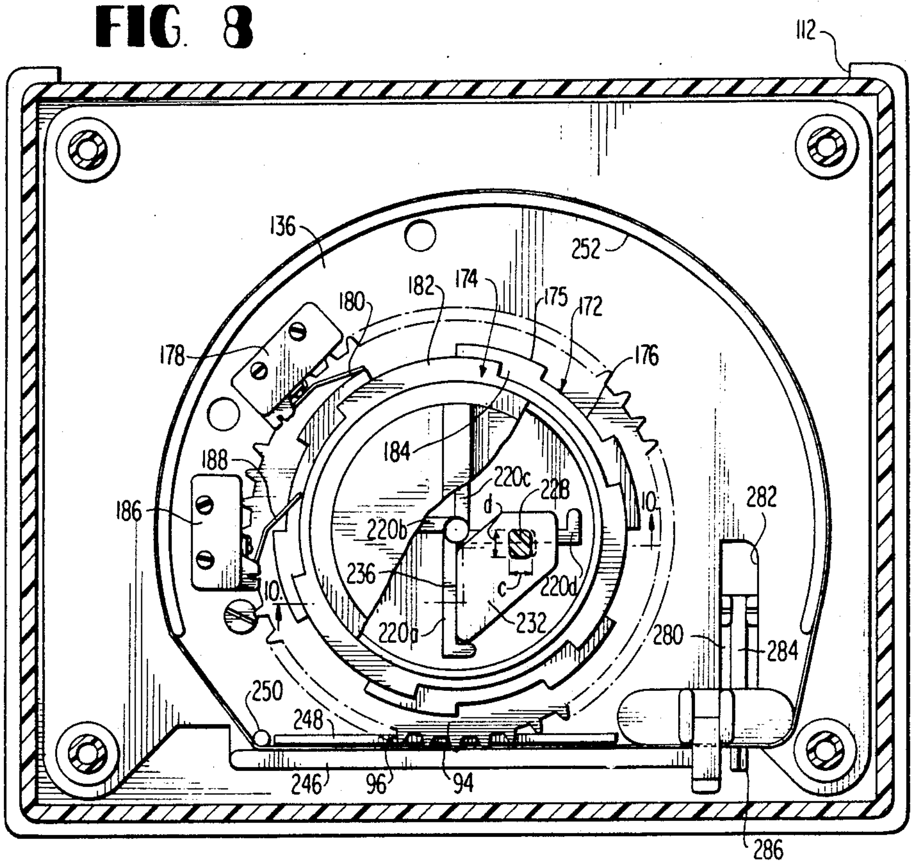
Figure 9:
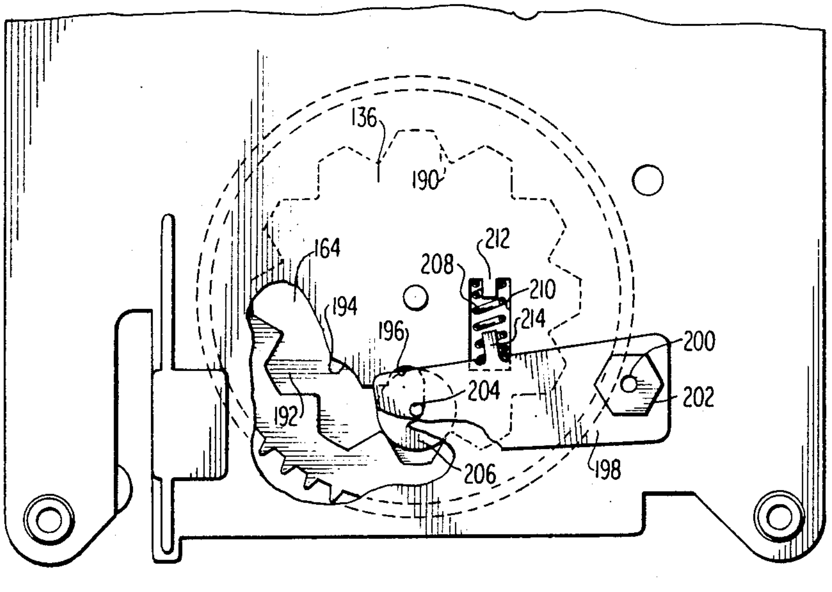
Figure 13:
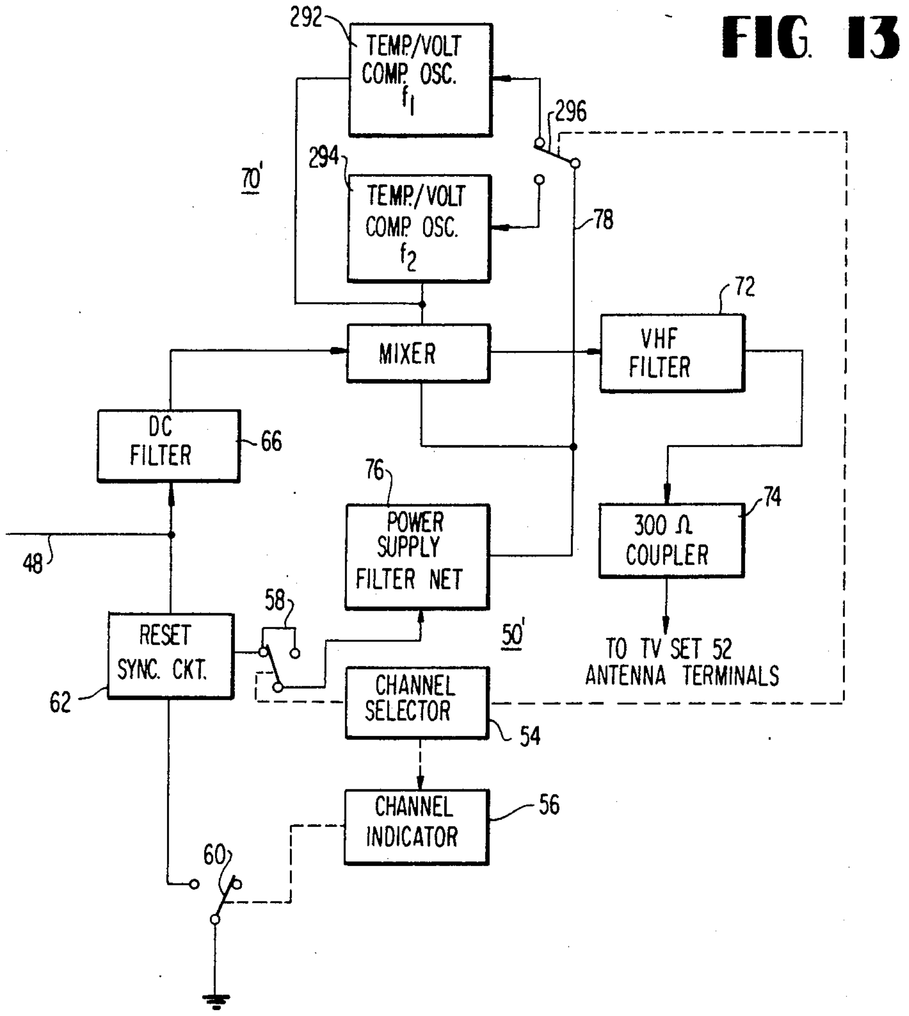
Figure 10:
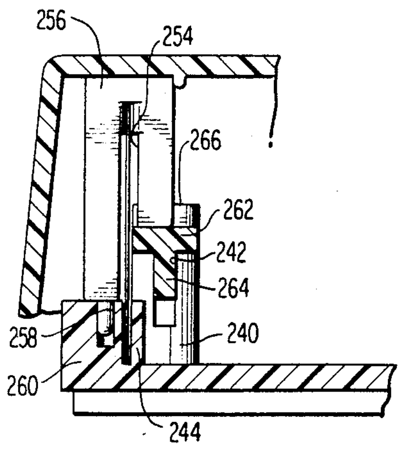
Figure 11:
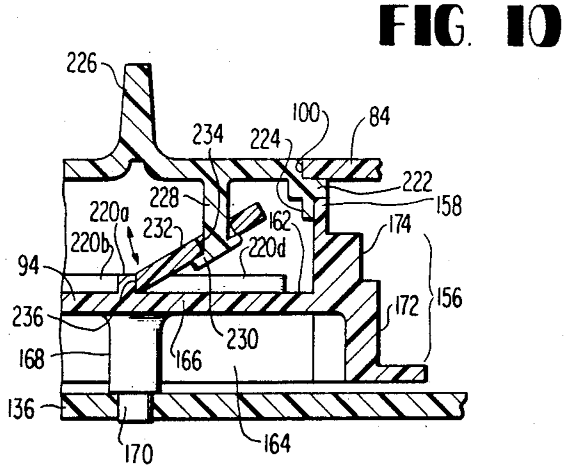
Figures 14A, 14B, 14C, 14D:
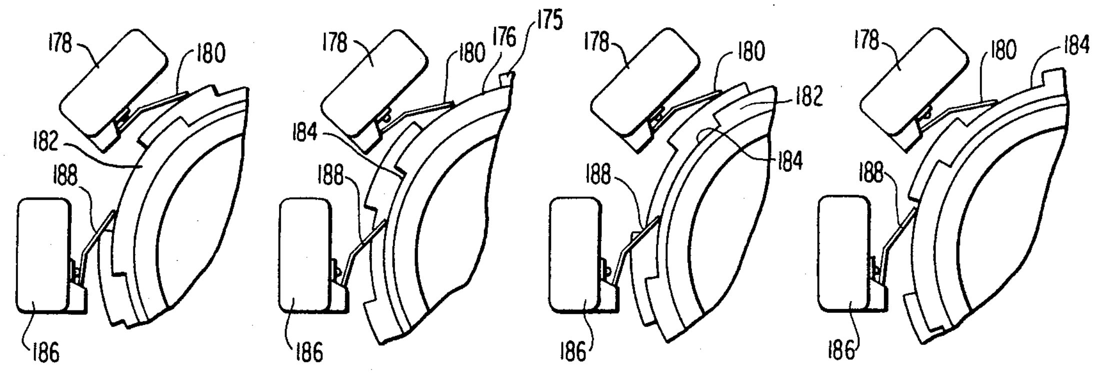
Figure 15:
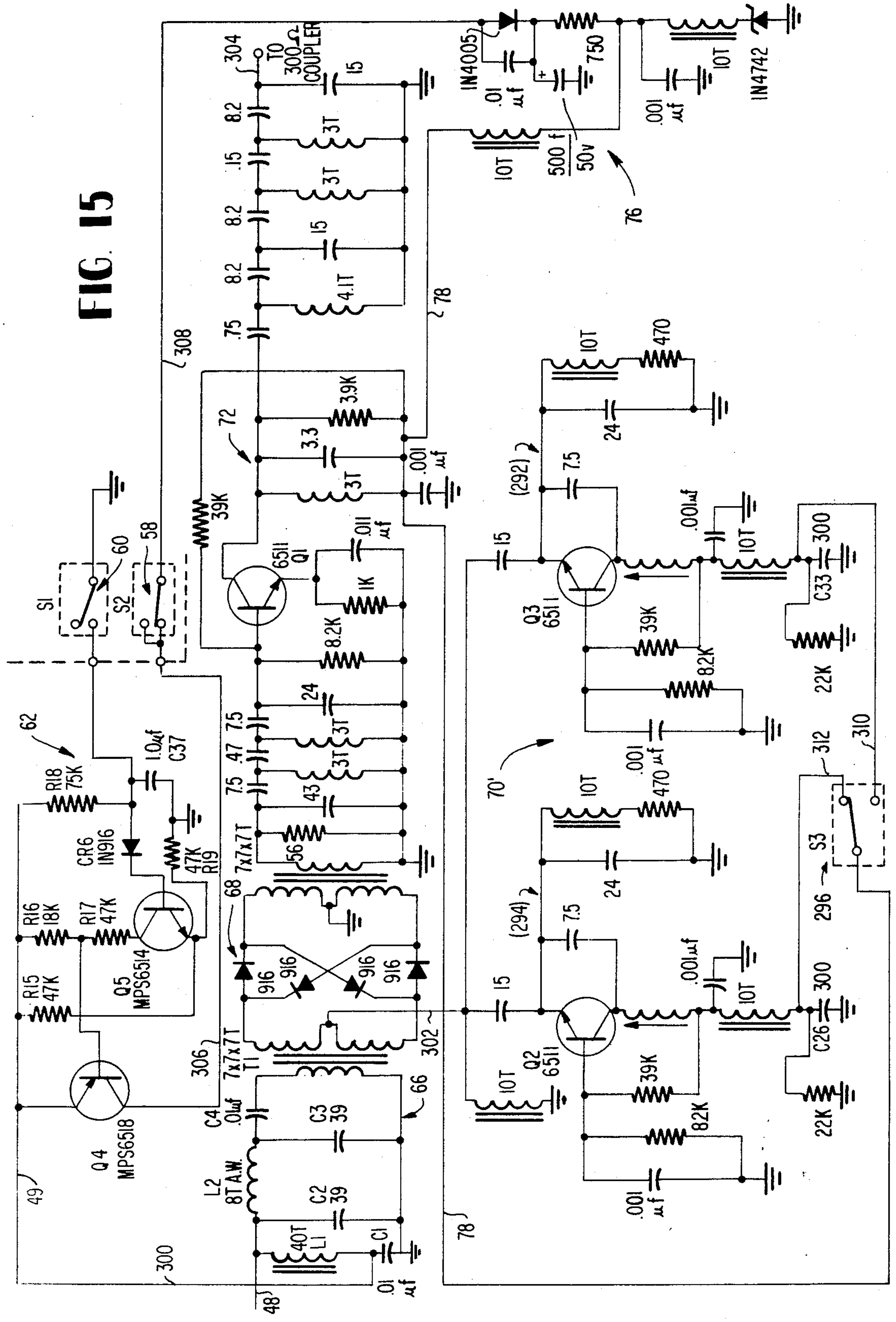

FIGS. 3*a* and 3*b* are waveform diagrams showing a suitable channel selection and reset synchronization signal code;

FIG. 4 is a pictorial view showing external features of the subscriber station control unit;

FIG. 5 is a vertical cross-sectional view taken near the front of FIG. 4 along line 5—5 with portions broken away to show internal features;

FIG. 6 is a fragmentary view of a portion of FIG. 5 showing the reset synchronism mechanism in operation;

FIG. 7 is a fragmentary cross-sectional view of the channel selection display window taken generally about on line 7—7 in FIG. 4 and particularly illustrating the guide for the display loop;

FIG. 8 is a horizontal cross-sectional view of the selector mechanism taken at the top of FIG. 5 along line 8—8 with portions broken away for clarity;

FIG. 9 is a fragmentary bottom plan view with portions broken away illustrating the construction of the channel selection detenting mechanism;

FIG. 10 is a vertical cross-sectional view taken along line 10—10 in FIG. 8 illustrating the one-way drive mechanism for the selector wheel;

FIG. 11 is a vertical cross-sectional view taken along line 11—11 in FIG. 5 illustrating parts of the guide for the channel display loop;

FIGS. 12*a*–12*f* are schematic diagrams showing the operating sequence of the selector mechanism and the reset synchronization signal;

FIG. 13 ia a block diagram similar to FIG. 2 showing a modification of the subscriber station control unit to accommodate a multiple frequency system;

FIGS. 14*a*–14*d* are schematic diagrams similar to FIGS. 12*a*–12*f* showing the operational sequence of the selector mechanism for frequency operation; and FIG. 15 is a detailed circuit diagram of the electronic portion of the subscriber unit.

Figure 1:
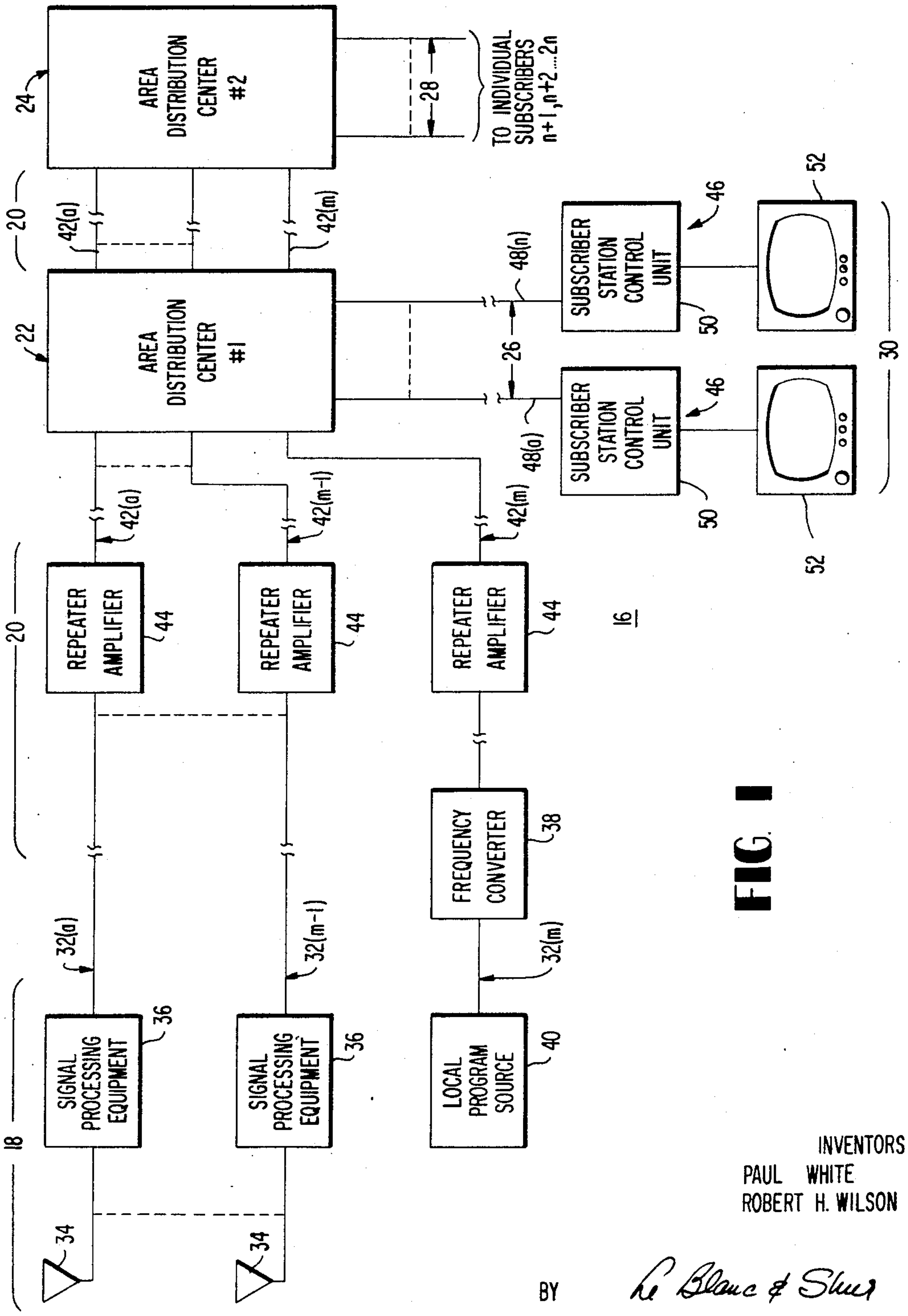
FIG. 1 is a functional block diagram showing a cable television distribution system with which the subscriber station control unit of the present invention may advantageously be used.

Referring first to FIG. 1, there is shown in block diagram form, a cable television distribution system of the type disclosed and claimed in the aforementioned Merrill et al patent application. As generally noted above, the Merrill et al. system possesses a capability of delivering any one of a relatively large number of programs of television material (e.g., 20, or even 40 or more) to any one or more of a much larger number of subscriber stations, in response to selection commands generated by individual subscribers.

Broadly speaking, the system, generally denoted at 16 in FIG. 1, includes five basic functional portions — namely, the antenna site equipment 18, a distribution trunk network 20, a plurality of area distribution centers such as 22 and 24, a plurality of individual subscriber line groups such as 26 and 28 associated with distribution stations 22 and 24 respectively, and a plurality of subscriber station groups such as group 30 associated with area distribution center 22 (as well as other subscriber station groups, not illustrated, associated with area distribution centers 24).

Antenna site equipment 18 includes a plurality of off-the-air processing units 32(a) through 32(m—1) providing frequency conversion and other required signal processing for each of (m—1) off-the-air channels to be delivered to the system. One or more additional processing units such as 32(m) provides locally generated program material for insertion in the system. As explained in detail in the abovementioned Merrill et al. application, each off-the-air processing unit includes a receiving antenna 34, and the required signal processing equipment 36. Local program processing unit 32(m) includes a local program source 40, i.e., conventional television signal generating equipment and suitable frequency conversion equipment 38.

Among the functions of signal processing equipment 36 are provision of automatic gain control, bandpass shaping, output level gain control and stabilization of the visual-aural carrier signal level ratio. Also, the incoming VHF or UHF signal is down-converted to the 7–13 MHz sub-channel. One particular feature of the Merrill et al system is that each channel of incoming program material is down-converted to the same sub-channel and each is transmitted through the system over a separate discrete cable in trunk network 20 as hereinafter noted.

As will be understood, the program material provided by local program source 40 is also transmitted through the system in 7–13 MHz sub-channel. A separate discrete cable in trunk network 20 is provided for each locally generated channel, as in the case of the down-converted off-the-air channels.

Trunk network 20 includes a plurality of discrete cables 42(a) through 42(m), one for each channel of program material. Each discrete cable includes one or more repeater amplifiers 44 spaced at appropriate intervals to maintain the desired signal level throughout the system.

Area distribution centers 22 and 24 provide interconnection between the individual cables 42(*a*)–(m) of trunk network 20 and the individual subscriber stations, under control of the subscriber station itself. Also, the area distribution centers preferably provide DC power to the subscriber stations for operation of certain local equipment including the channel selector mechanism, the sub-channel to VHF converter and the channel selector synchronizing mechanism.

Subscriber group 30 comprises a plurality of individual subscriber stations 46 connected to area distribution center 22 by a respective one of a plurality of two-wire subscriber cables 48(a) through 48(n).

Each subscriber station 46 ordinarily comprises a television receiver in a subscriber's home. However, as explained in the Merrill et al. application, subscriber stations may comprise a link in a two-way communication network, such as a video-telephone system, a channel in a visual monitoring system for space protection, meter reading, etc., a link in a business data exchange network, or virtually any other form of visual communication application which may be desired.

In the home television receiver embodiment illustrated in FIG. 1, subscriber stations 46 each include a subscriber station control unit 50 connected between the respective subscriber cable 48 and a conventional television receiver 52. The subscriber station control unit includes circuitry required for carrier frequency conversion from the 7–13 MHz sub-channel to a locally unassigned VHF channel, and equipment for generating channel selection and synchronizing signals to be transmitted over the subscriber line to the associated area distribution center. Also, the subscriber station control units provide a visual channel selection indication for user convenience.

A detailed block diagram of control unit 50 in accordance with this invention is shown in FIG. 2. The subscriber station control unit is shown and described in the context of the Merrill et al cable television distribution system of FIG. 1, but it should be understood that the control unit may readily be adapted for use in any system requiring the generation of subscriber initiated channel selection and synchronizing signals for transmission to a remote program distribution center.

Turning now to FIG. 2, the subscriber station control unit 50 comprises a channel selector mechanism 54, mechanically coupled to a channel selection indicator 56, and to a channel selection signal generator switch 58 shown as a two position switch with shorted fixed contacts. A reset synchronization signal generating switch 60 shown as a normally open contact pair is controlled by the channel indicator 56.

Subscriber station control unit 50 also includes a subchannel to VHF converter 64 including a DC (high pass) filter 66, a mixer 68, a temperature/voltage compensated oscillator 70, a VHF filter 72, and a 300 ohm coupler 74 adapted to be coupled to the antenna terminals of the television receiver 52.

As will be recalled, in the Merrill et al. system, the area distribution center preferably provides operating power for each of the subscriber station control units by transmitting a DC operating voltage along subscriber line 48. For such a system, the subscriber station control unit also includes a power supply filter network 76 connected in series with channel selection signal generator switch 58 to the subscriber through a reset synchronization circuit 62 as illustrated. The output of power supply filter network 76 is coupled by lead 78 to mixer 68 and temperature/voltage compensated oscillator 70 to provide the required operating power.

In accordance with the preferred embodiment of this invention, channel selector mechanism 54 directly controls channel selection signal generator switch 58 and the channel indicator mechanism 56. The latter, in turn, operates reset synchronization signal generator switch 60. This is indicated by the above mentioned mechanical linkage shown in FIG. 2.

With reference to FIGS. 2 and 3, it will be understood that with channel selection signal generator switch 58 in either of its normally closed positions, power supply filter network 76, mixer 68 and oscillator 70 represent a substantially constant DC load for the operating power provided over subscriber line 48 from area distribution center 22. With reset synchronization signal switch 60 in its open position, opening channel selection switch 58 removes the DC load from subscriber line 48 causing an increase in the DC voltage. Thus, if channel selection signal switch 58 is transferred from one of its rest positions to the other, during the brief transition between states, a pulse such as shown in FIG. 3(a) will be generated and transmitted along subscriber line 48 to the area distribution center. As shown, the transition time is about 3 milliseconds.

By employment of suitable pulse sensing circuitry such as described in the Merrill et al. application, a pulse generated by the subscriber station control unit in this manner may be used to operate appropriate switching equipment at the area distribution center to connect subscriber line 48(a) in sequence to each of lines 42(a) through (m) in distribution trunk network 20.

Further in accordance with a preferred embodiment of this invention, a second going voltage pulse of extended duration such as shown in FIG. 3(b) is employed as a reset synchronization signal. This is accomplished by a reset synchronization circuit 62. Operation of the latter will be described more fully below, but basically, closure of switch 60 disconnects switch 58 from line 48 for a period of about 100 milliseconds as controlled by the charging of a capacitor. As in the case of the channel advance pulse, the resulting decrease in the DC load produces the pulse shown in FIG. 3(b) which is transmitted over the subscriber line to the area distribution center. Again, appropriate pulse sensing circuitry is employed to return the switching network associated with the particular subscriber station to its initial or channel No. 1 position.

Turning now to FIGS. 4 – 11, there is illustrated in detail the construction and operation of subscriber station control unit 50, including channel selector mechanism 54, channel selection indicator 56, channel selection switch 58, and reset synchronization switch 60.

Referring particularly to FIGS. 4 and 5, subscriber station control unit 50 comprises a relatively small box-like structure (e.g., about 6 inches × 5 inches × 3 inches) having a cover 84 molded of a suitable plastic material such as ABS polymer or the like. A display window 86 in the front of cover 84 is provided through which the indicia bearing channel selection indicator 56 is viewed.

Channel selection indicator 56 is comprised of a continuous loop 88 of flexible material such as cellulose acetate or the like carrying a series of numerical indicia 90 in spaced side-by-side relation, and so positioned as to appear in window 86 as loop 88 travels around the inside of the unit. As shown in FIGS. 5 and 6, a series of sprocket holes 92 along the lower edge of loop 88 engage with a drive wheel 94 having sprocket teeth 96 for advancing the display from one channel indication to the next. A manual selector knob 98 protruding through an opening 100 in the top of cover 84 surrounded by a recessed well 102 operates drive wheel 94 as described below.

Referring particularly to FIG. 5, control unit 50 is mounted on an aluminum base 104 having a generally rectangular bottom plate 106 and an upstanding generally rectangular flange 108 forming a back.

One or more electrical connectors 110 are attached to base flange 108 in conventional fashion and protrude outwardly from the rear of the unit as shown in FIG. 7. A cutout 112 as shown in FIG. 8 is provided in the back of cover 84 through which access to connectors 110 carried by back flange 108 is provided.

The electronic portion of subscriber station control unit 50 is contained on a printed circuit board, not shown, suitably secured to upstanding dimples 116 formed on bottom plate 106. The electronic circuitry described above in connection with FIG. 2 is preferably comprised of conventional resistance, capacitance, and inductive elements together with transistor and/or integrated circuit components as required. Aluminum base 104 provides adequate shielding to minimize RF and other interference.

The channel selection and indicator mechanisms 54 and 56 are mounted on a generally rectangular support shelf 136 positioned within cover 84 above the electronic sub-unit. Shelf 136, preferably formed of ABS or similar material, carries four depending sleeves 138 adjacent its corners spacing shelf 136 above bottom plate 106 and the circuit board, not shown, mounted thereon. Bosses 140 lie on the upper face of shelf 136 in vertical registry with sleeves 138 and have upwardly opening diametrically enlarged recesses 144 forming annular seats 142. Cover 84 includes four downwardly extending internally threaded connecting posts 148 in registry with sleeves 138, the lower ends of posts 148 being receivable in recesses 144 and engaging seats 142. Elongated bolts 150 are received through openings in bottom plate 106 in registry with sleeves 138 and extend upwardly through sleeves 138 and bosses 140 for threaded engagement in support posts 148. Rubber feet 154 are mounted on the underside of bottom plate 106 for support of station control unit 50.

As best illustrated in FIGS. 5 and 8–10, selector drive wheel 94 preferably comprises a molded structure formed of acetal or similar material having an intermediate portion 156, a reduced diameter upper portion 158, and an enlarged diameter lower portion 160 forming a sprocket wheel carrying sprocket teeth 96. As best illustrated in FIG. 10, upper and lower portions of wheel 94 are recessed at 162 and 164 respectively. A hub 166 extends across wheel 94 at an elevation intermediate its height separating the two recesses. Drive wheel 94 is rotatably supported on shelf 136 by a central depending stem 168 having a reduced diameter portion 170 journalled in an aperture in support shelf 136. Upper portion 158 of wheel 94 is generally annular in configuration as is intermediate portion 156.

Intermediate portion 156 comprises two axially spaced circumferentially extending camming surfaces 172 and 174 with the lower camming surface 172 having a larger radial extent than the upper camming surface 174. As will appear from the ensuing description, for operation in accordance with the system of the Merrill et al. patent application, the lower cam surface 172 forms a part of the channel selection mechanism. In the embodiment illustrated in FIG. 13, wherein multiple programs are carried on each distribution cable, the channel selector mechanism utilizes both camming surfaces 172 and 174, the upper surface 174 providing channel advance pulses to the ADC while the lower camming surface 173 operates the selective frequency conversion circuitry to convert incoming programs in different frequency transmission bands to the frequency of the locally unassigned standard channel used for display. It will be appreciated that both camming surfaces 172 and 174 are provided on a standardized selector wheel 94 for ease of manufacture and use of a standard wheel 94 in station control units 50 for either embodiment hereof.

Referring now to FIG. 8, the lower camming surface 172 comprises a plurality of radially enlarged camming segments 175 equally spaced one from the other about the periphery of wheel 94, the radially enlarged camming segments 175 defining a plurality of equally spaced radially reduced recesses 176 therebetween. The circumferential extent of the segments is equal to the circumferential extent of the recesses at like radii. For use in the Merrill et al. system, the channel selector switch 58 comprises a microswitch 178 mounted on integrally formed posts, not shown, upstanding from shelf 136. Microswitch 178 carries a spring arm 180 in following engagement with camming surface 172. It will be appreciated that as drive wheel 94 is rotated in a clockwise direction as illustrated in FIG. 8, spring 180 successively engages cam segments 175 and within recesses 176 between the cam segments 175. Since the fixed contacts are connected together, an open circuit exists only during the transition periods, i.e., while follower 180 is passing between surfaces 175 and 176 or 176 and the next adjacent surface 175. This provides the pulses over the communication path to the area distribution center for channel selection as previously explained.

Upper camming surface 174 is radially reduced as compared with the camming surface 172 and comprises a plurality of radially enlarged camming segments 182 equally spaced one from the other about the periphery of wheel 94 and defines a plurality of equally spaced radially reduced recesses 184 therebetween. The circumferential extent of segments 182 is equal to the circumferential extent of the recesses 184 at like radii. A microswitch 186 having a spring arm 188 in engagement with the camming surface 174 provides actuation for the microswitch. For the embodiment being described, microswitch 186 may be omitted since it serves no function. For the embodiment of FIG. 13, however, microswitch 186 operates as the channel advance switch 50 and microswitch 178 control switching from one frequency to another to select which of the two programs transmitted on each distribution cable is to be viewed. For reasons discussed hereinafter, the angular extent of the cam segments 182 and recesses 184 is exactly twice the angular extent of cam surfaces 175 and recesses 176. Also, it will be appreciated from a review of FIG. 8 that camming surface 175 is circumferentially staggered with respect to camming surface 172 and this permits staggering of the microswitches 178 and 186 within unit 50 for each of construction and assembly. It will be appreciated that these surfaces need not be staggered.

Referring now to FIG. 9, the circumferential wall 190 defining recess 164 on the underside of wheel 94 is provided with a series of indentations 192 equally spaced one from the other about the periphery of recess 164, the indentations being equal in number to the number of changes in radii from cam segments 175 to recesses 176 for reasons as will become apparent. A keyhole type slot 194 with a lateral enlargement 196 toward the center of wheel 94 is formed in shelf 136. A lever 198 is mounted on the underside of shelf 136 for pivotal movement about a screw 200 extending through shelf 136 and lever 198. A nut 202 threadedly engages screw 200 to secure lever 198 to shelf 136. The free end of lever 198 carries a stub shaft 204 extending through the narrow portion of keyhole opening 194 and mounts a roller 206 on the upper side of shelf 136 for engagement in the indentations 192 formed on wheel 94. As illustrated in FIG. 9, lever 198 is provided with a counterclockwise bias by means of a spring 208 disposed in a slot 210 in shelf 136. Spring 208 bears at one end against the end of slot 210 and at its opposite end against the edge of lever 198. Pins 212 and 214 are provided respectively in slot 210 and on lever 198 to retain spring 208 in slot 210. Accordingly, as illustrated in FIG. 9, lever 198 is biased in a counterclockwise direction whereby roller 206 engages in successive indentations 192 on wheel 94 to detent the wheel 94 in a selected rotary position. It will be appreciated that movement of wheel 94 pivots lever 198 in a clockwise direction as illustrated in FIG. 9 against the bias of spring 210 from its detenting position, the stub shaft 204 extending in lateral enlargement 196 of slot 194 when wheel 94 is in a non-detenting position.

As will be recalled, wheel 94 is driven manually by a selector knob 98, knob 98 and wheel 94 cooperating to permit clockwise rotation of wheel 94 in response to clockwise movement of knob 98 (FIG. 8) and free-wheeling counter-clockwise movement of knob 98 without movement of wheel 94. To accomplish the foregoing, and referring particularly to FIGS. 5, 8 and 10, the upper surface of plate portion 166 of wheel 94 is provided with four raised ribs 220*a*, 220*b*, 220*c* and 220*d*. Ribs 220 extend outwardly from the axis of wheel 94 in a generally radial fashion but slightly displaced in a clockwise direction (FIG. 8) from radii paralleling the centerline of ribs 220. By orienting the ribs in this manner and as particularly illustrated in FIG. 8, the trailing edges of ribs 220*a–d* lie coincident with radii of wheel 94.

These ribs are arranged to cooperate with selector knob 98 to form the one-way rotational mechanism. Particularly, knob 98 is mounted for rotation in opening 100 of cover 84 and is retained therein by a depending diametrically enlarged peripheral rim 222 (FIG. 10) which engages between the marginal portions of cover 84 about opening 100 and the upper annular portion 158 of wheel 94. Rim 222 includes a depending annular portion 224 which engages along the inside wall of upper portion 158 of wheel 94. Selector knob 98 includes an outwardly projecting tab 226 which extends substantially the full diameter of the knob and which facilitates rotation of knob 98 when grasped between a viewer's fingers.

Depending from the underside of knob 98 is an elongated stem 228 having a generally rectangular cross section and an inclined and enlarged lower surface 230. A selector wheel drive element 232 is loosely carried on stem 228 with the latter being received in a generally rectangular aperture 234 in element 232, the enlarged portion 230 of stem 228 retaining element 232 on stem 228. Aperture 234 has one dimension *c* (FIG. 8) sufficiently larger than the corresponding dimension of stem 228 to permit pivotal motion of element 232 in the direction indicated by the arrow in FIG. 10. Aperture 234 has another dimension d (FIG. 8) only slightly larger than the corresponding dimension of stem 228 to prevent pivotal motion of drive element 232 in a horizontal plane. The lower edge of element 232 is beveled at 236 and is so dimensioned and positioned that when knob 98 and wheel 94 are properly rotatably oriented with respect to one another, element 232, as best illustrated in FIG. 8, rests on hub 166 of wheel 94 with edge 236 thereof bearing against the radially extending edge of an upstanding rib 220. As will be understood, if selector knob 98 is rotated in the clockwise direction as indicated in FIG. 8, edge portion 236 continues to bear on the radial face of rib 220 and causes drive wheel 94 to rotate. However, if knob 98 is rotated counterclockwise as illustrated in FIG. 8, corresponding counterclockwise motion of wheel 94 is precluded (wheel 94 remaining in a detented position by wheel 206 previously described), since element 232 merely slides along hub 166 and pivots upwardly out of the way when the lower end thereof engages preceding ribs 220. Knob 98 thus rotates in a counterclockwise direction independently of drive wheel 94 with element 232 being successively pivoted upwardly out of the way upon engagement with ribs 220. Of course, when knob 98 is again rotated clockwise, the beveled edge 236 of element 232 again engages the radial face of the next rib 220, thereby engaging wheel 94 with knob 98 whereby clockwise rotation of wheel 94 is provided by like clockwise rotation of knob 98. It will be appreciated that wheel 206 engages in successive indentations 192 on wheel 94 to detent the wheel 94 in selected positions and that it is only upon further rotation of wheel 94 in the clockwise direction that wheel 206 pivots to successive indentations 192. The wheel 94 thus steps in one direction only.

Referring now to FIGS. 5, 7, 8 and 11, and as will be recalled, the channel selection display comprises a closed loop 88 having suitable indicia thereon indicating the selected channel in display window 86. Display loop 88 is moved the distance required to advance the next channel identification indicia into display position for each step advanced by drive wheel 94. This is accomplished by means of a series of sprocket teeth 96 disposed about the lower portion 160 of wheel 94. Sprocket teeth 96 are adapted to engage the sprocket holes 92 in the display loop 88 just below and behind display window 86.

Display loop 88 is supported for movement through the display window by a guide which includes closely spaced upstanding pins 240, bifurcated at their upper ends at 242 (FIG. 11), and a smaller intermediate pin 244 disposed between pins 240. A track is integrally molded on the upper front side of shelf 136 and includes an upstanding front rail 246 and a rear rail 248 of reduced height defining a track therebetween for receiving the lower edge of flexible loop 88. A guide pin 250 is provided on shelf 136 adajcent the left hand end of the track as illustrated in FIG. 8. An arcuate guide fence 252 upstands from support shelf 136. It will be appreciated that loop 88 extends about arcuate guide fence 252 and about pins 244 and 250 with the lower edge thereof being received in the track defined by rails 246 and 248 adjacent the front side of unit 50. Sprocket teeth 96 on wheel 94 extend through the sprocket holes 92 in loop 88 just above rails 246 and 248.

To retain loop 88 in proper position and prevent it from moving upwardly, a vertically elongated narrow slot 254 is provided in an inverted generally U-shaped retainer element 256 having, on one of its legs, a reduced diameter projecting pin 258 (FIG. 11) receivable in an opening formed in a boss 260 formed on shelf 136. The end of the opposite leg of element 256 butts against the top surface of an elongated generally T-shaped spacing element 262, the stem 264 of which is receivable in the bifurcated slots 242 of pins 240. A pair of spaced projections 266 are provided on the upper surface of part 262 to form a slot for receiving the lower end of the rearmost leg of element 256. To maintain part 256 in the position illustrated in FIG. 11, the undersurface of cover 84 has a pair of downwardly projecting ribs 268 which, when the cover 84 is secured to the shelf 136, straddle the upper edge of element 256 maintaining it in the position illustrated in FIG. 11. A pair of integrally cast beveled edges 270 are provided on opposite sides of ribs 268 to facilitate insertion of element 256 between ribs 268 when the unit is assembled. Thus, when shelf 136 is assembled with cover 84, element 256 is receivable between ribs 268 locking it in position with its lower reduced end 258 in the aperture in boss 260 and the opposite leg received between lugs 266.

Referring to FIG. 7, a pair of guide surfaces 272 and 274 are suitably secured in spaced relation one from the other behind display window 86. Guide surfaces 272 and 274 carry spaced ribs 276 and 278 respectively. When display loop 88 is disposed between guide surfaces 272 and 274, the ribs on guide surface 272 bear along the upper and lower edges of loop 88 along the sprocket holes thereof to maintain the loop centered with respect to display window 86. The front guide surface 272 is, of course, formed of a clear plastic or like material while the back guide surface 274 is preferably colored to provide suitable contrasting background to the indicia or the area of loop 88 surrounding the indicia. Ribs 278 serve no function but parts 272 and 274 are identical so a single mold may be employed for both.

The reset synchronization signal generating switch 60 comprises a microswitch 280 suitably secured in a slot 282 formed in shelf 136 directly adjacent the boss 260 mounting the loop display retaining element 256. Slot 282 opens between the bifurcated mounting pins 240 and the microswitch 280 is suitably secured therein. Microswitch 280 has a forwardly extending cantilevered upwardly biased spring arm 284, the distal end 286 of which is generally in the form of an inverted V. The lower edge of display loop 88 engages the upper edge of end 286 normally depressing spring arm 284 against its upward bias to maintain microswitch 280 in a normally open condition.

To close switch 60, there is provided a notch 288 (FIG. 6) in the lower edge of the display loop 88. Notch 288 is of such dimension that, as it passes over the distal end 286 of spring arm 284, the upward bias of spring arm 284 displaces it into the notch momentarily closing microswitch 280. The notch has rounded edges which cooperate with the flat sides of the generally V-shaped spring arm end 286 such that arm 284 engages within and is quickly urged out of notch 286 upon further movement of the display loop 88 past the switch position.

Figure 12A:
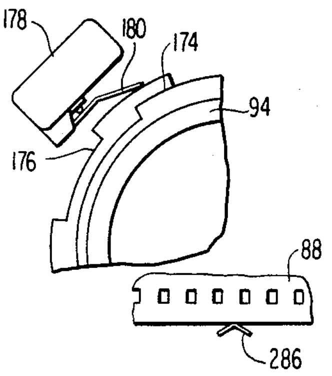
Figure 12B:
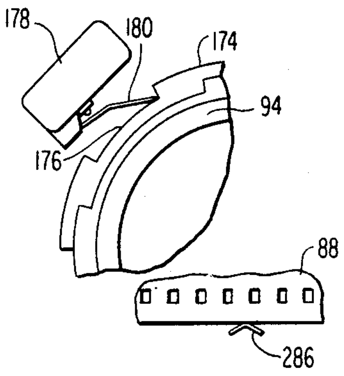
Figure 12C:
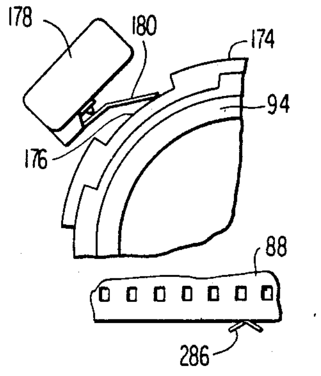
Figure 12D:
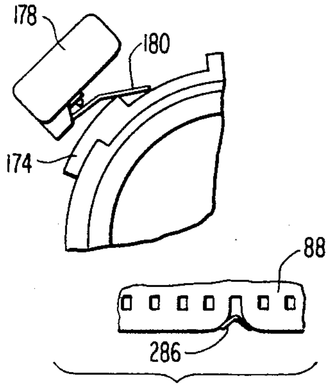
Figure 12E:
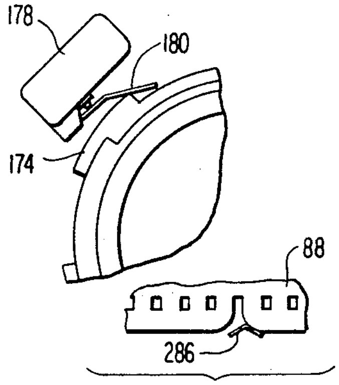
Figure 12F:
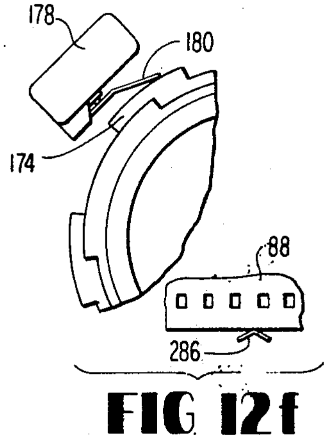

The sequence of contact openings and closings may best be appreciated from the operating diagrams illustrated in FIGS. **12*a*–12*f* which show the relationship between the cam segments 175 and spring arm 180 on camming surface 172 and between the display loop 88 and microswitch spring arm 284 for different parts of each complete cycle of the display loop. FIGS. 12*a*–12*c* illustrate the channel selection operational sequence for a channel other than channel 1. FIG. 12*a* illustrates selector wheel 94 in a detented condition with the detent wheel 206 (FIG. 9) in one of the indentations 192 and the spring arm 180 of microswitch 178 bearing on a cam segment 175 maintaining channel selector switch 58 closed as illustrated in FIG. 2. The bottom edge of display loop 88 engages the end 286 of spring arm 284 to maintain switch 60 illustrated in FIG. 2** in a normally open condition.

As a channel advance operation begins, drive wheel 94 is rotated by turning selector knob 98 in a manner previously described. The detent wheel 206 is pivoted from its detenting position in an indentation 192 in the lower side of wheel 94 and engages in the next indentation 192 to detent the wheel 94 in an advanced position. When wheel 94 rotates from one detented position to the next, the spring arm 180 falls from cam segment 175 into recess 176 as illustrated in FIG. **12*b* and when wheel 94 is fully advanced, spring arm 180 and wheel 94 obtain the positions illustrated in FIG. 12*c*. In moving from the position illustrated in FIG. 12*a* to the position in FIG. 12*c*, the channel selection switch 58 comprised of microswitch 178 is thus shifted from one of its contacts to the other as illustrated in FIG. 2. Consequently, the channel selection switch momentarily opens before again closing in the next detented position of wheel 94.**

As previously described, the momentary opening of this switch pulses the ADC over the communication path and thereby provides a channel advance pulse thereto. Also, as previously explained, rotation of drive wheel 94 from one detented position to the next advances display loop 88, by means of the sprocket teeth 96 engaging in sprocket holes 92, the distance required to display the next channel indicia. It will also be noted that during the entire channel selection, the channel selection reset synchronization switch 60 is maintained in a normally open condition by the lower edge of the display loop 88 which maintains the spring arm 284 in a switch open condition.

The above described operation continues for as many partial or complete rotations of drive wheel 94 as are required to complete one cycle of display loop 88. A different operation occurs, however, when the indicator is advance from the last channel to channel 1, since the reset synchronization pulse must be generated at that time. The sequence of this operation is indicated in FIGS. **12*d*–12*f*.**

FIG. **12*d* illustrates the condition existing just before drive wheel 94 reaches the detent position corresponding to the display position for channel 1. The portion of the display loop 88 containing notch 288 has passed over and received the distal end 286 of spring arm 284 to close switch 60. This initiates generation of the reset synchronization pulse illustrated in FIG. 3*b*, as described below. As drive wheel 94 advances further into the detent position for channel 1, spring arm 180 passes from a recess 176 to a cam segment 174 momentarily opening microswitch 178 which generates the channel selection pulse. The exact relationship between operation of switches 176 and 280 is not critical since the reset synchronization pulse masks the channel selection pulse and synchronism between the ADC and the subscriber station is restored at the beginning of each display loop cycle by momentary closure of switch 60.**

As the display loop is advanced to indicate channel 1 in the display window 86, the notched portion of loop 88 passes beyond spring arm 284 and returns microswitch 280 to its normally open position. As will be appreciated, the condition of the system illustrated in FIG. **12*f* is identical to the condition of the system illustrated in FIG. 12*a* and operation thereof continues in the manner previously described until another cycle of loop 88** has been completed.

Actuation of the reset synchronization switch by means of the notch in loop 88 renders the reset operation completely independent of the number of cam segments on drive wheel 94, and allows replacement of the display loop to increase system channel capacity with no other change in the subscriber's station unit 50. Of course, selector drive wheel 94 rotates as many times as is required to accomplish a complete selection cycle, each cam segment generating an advance pulse without regard to the identity of the channel involved.

The above described arrangement is highly advantageous in avoiding difficulties encountered in transmitting many channels over a single cable. However, it will be appreciated that for a system involving a very large number of channels, for example, thirty or more, the cost of cable for an extensive installation, and in fact the practicalities of extending large number of cables from place to place may become significant considerations. Under such circumstances, a modified discrete cable technique may be of advantage.

In particular, if each of distribution trunks 42 in FIG. 1 is employed to carry more than one channel of program information in a series of well spaced frequency bands, then interference between adjacent channels can be kept at a satisfactory level. It has been found that if each distribution cable carries at most three subbands, entirely satisfactory results can be obtained. At the same time, the frequencies employed are not so high that serious attenuation effects are encountered and an excessive number of repeaters are not required.

A system of the foregoing type employing, in effect, a combination of space diversity and frequency multiplex concepts is disclosed in copending U.S. Pat. application Ser. No. 177,256 filed Sept. 2, 1971 now abandoned.

In such a system, the switching equipment at the ADC's carries several programs in each switch position. Thus, several programs are transmitted simultaneously to each subscriber, and means are provided at each subscriber station for selecting the desired one of the simultaneously available programs. This arrangement is much more economical in a very large system. For example, in a system employing three channels per cable, only 1/3 as many cables and switch states are required, but provision must be made to prevent the area distribution center equipment from advancing for two out of every three advancements of the subscriber station control units. This is accomplished by the modified equipment shown in FIGS. 13 – 15.

The channel selection mechanism,described in connection with FIGS. 4 – 12 above, lends itself quite conveniently to such modification. A functional block diagram of an arrangement for this purpose is shown in FIG. 13, wherein portions corresponding to those shown in FIG. 2 are identified by like reference numerals, and modified portions by primed (′) reference numerals. The modifed subscriber station control unit 50′ comprises a selector mechanism 54, a channel indicator 56, normally closed channel selection switch 58, and a normally open reset signal generating switch 60. Channel indicator 56 and switch 58 are mechanically operated by channel selector mechanism 54 while the channel indicator 56 operates switch 60.

As in the case of control unit 50, the electronic portion of modified control unit 50′ comprises a DC filter 66, a mixer 68, and a VHF filter 72, a 300 ohm coupler 74, and a power supply filter network 76, connected through reset synchronization circuit 62 and channel advance switch 58 to subscriber line 48.

In addition, there is provided a local oscillator 70′ for controlling sub-band to VHF conversion in normal fashion. However, it will be recalled that in the modified system up to three sub-bands are simultaneously present on communication channel 48. To permit selection of the desired channel, oscillator 70′ is constructed to operate at several selectable frequencies as required to convert all of the available sub-bands to the desire locally unassigned VHF frequency.

By way of example, for a system having two subbands centered at frequencies $f_A$ and $f_B$, and an available VHF channel $f_C$, local oscillator 70′ is arranged to provide two frequencies $f_1$ and $f_2$ such that $f_1+f_A=f_C$ and $f_2+f_B=f_C$. For this purpose, oscillator 70′ may be regarded as comprised of two separate oscillator stages 292 and 294 producing frequencies $f_1$ and $f_2$, respectively. Oscillators 292 and 294 are actuated by a switch 296 which provides operating power alternately to one or the other of the oscillators from power supply filter network 76 over lead 78. Switch 296 comprising the microswitch 178 previously described is mechanically operated by channel selector mechanism 54 as hereinafter explained such that the respective one of oscillators 292 and 294 required for converting the sub-band for the desired channel then to the VHF channel is actuated.

The remainder of the system described above in connection with FIGS. 4 – 12 is employed in the multiple frequency embodiment except that camming surfaces 172 and 174 are both utilized.

Particularly, the microswitch 186 operates, as previously noted, as the channel advance switch. The stationary contacts are shorted; thus momentary opening of the switch during transition between a surface 182 and an adjacent recess 184 (or vice versa) generates channel selection pulse.

Microswitch 178 operates as oscillator selection switch 296. Thus, oscillator 292 (for example) is operated when arm 180 engages with a recess 176, while oscillator 294 is operated when arm 180 engages with a cam segment 175.

As previously noted, there are twice as many cam segments 172 as cam segments 174. Thus, microswitch 178 actuates one or the other of oscillators 292 or 294 for each detent position of wheel 94 while microswitch 186 generates a channel advance pulse for every second detenting postion. Thus, for each of a pair of successive detent positions of selector wheel 94, oscillator 292 will be actuated to convert the frequency of subband for the selected channel to the VHF channel required for display while for the next detent position, the oscillator 294 will be actuated to convert the frequency of sub-band for the selected channel to the VHF channel required for display. That is to say, oscillators 292 and 294 are utilized alternately for each successive detent position of wheel 94, while a channel advance pulse is provided only for every second detent position. FIGS. **14*a*–14*d* illustrate this cooperation. In FIG. 14*a*, assume channel 2 is displayed in the window of unit 50 and it is desired to select channel 3. Wheel 94 is rotated to the next detent position locating indicium 3 in the display window and rotating the wheel to the detented position illustrated in FIG. 14*b*. Spring arm 180 of microswitch 178 has fallen from cam segment 175 to recess 176 providing frequency selection as previously described corresponding to channel 3. Similarly, arm 188 has fallen into recess 184, generating a channel selection pulse. The latter is transmitted to the ADC which advances from the first cable containing channels 1 and 2 to the second cable carrying channels 3 and 4**.

For switching from channel 3 to channel 4, the selector wheel is rotated from the position illustrated in FIG.

14*b* to the position illustrated in FIG. 14*c*. Microswitch 178 is actuated to select the local oscillator required for channel 4, but the switch arm 188 of microswitch 186 remains in the recess 184 and no channel advance pulse is generated. The ADC is thus not affected by this channel selection.

In switching from channel 4 to channel 5, as shown in FIG. 14(*d*), microswitch 178 is again actuated and the other local oscillator is selected. However, spring arm 188 of microswitch 186 has moved from the recess 184 to the cam segment 182 thereby generating another channel advance pulse. Thus, the next cable, i.e., that carrying channels 5 and 6, is selected. The foregoing described sequence of operation is repeated with each of channels 1–20. Transition from channel 20 to channel 1 is identical to that described previously, with the ADC mechanism being reset to channel 1, irrespective of its previous state. Likewise, as will be understood, if the number of detent positions and the number of indicia on display loop are both even, the proper local oscillator will be actuated for channel 1.

FIG. 15 is a circuit diagram of the subscriber unit electronics for the embodiment of FIG. 13 including channel selection switch 58, reset synchronization switch 60, reset synchronization circuit 62, highpass filter 66, local oscillator 70', VHF filter 72, power supply filter network 76, and local oscillator frequency selection switch 296.

As illustrated, the incoming signal from the ADC on line 48, including the RF and DC components is provided over lead 48 through an RF choke L1 at the input of RF filter 66 and over lead 300 to the input of reset synchronization circuit 62. The RF component of the incoming signal passes through the LC filter network including inductor L2 and capacitors C2 through C4 to the input of mixer 68 through transformer T1. Also provided to the mixer is the output of local oscillator 70' over lead 302 as hereafter described. The output of mixer 68 is provided through VHF filter 72 and lead 304 to the 300 ohm coupler (not shown) for connection to the television set.

The DC signal on lead 300 is provided through transistor Q4 and lead 306 to channel advance switch 58, from which it is coupled over lead 308 to power supply filter network 76, the latter providing operating power for transistor Q1 in VHF filter circuit 72 and for transistors Q2 and Q3 in local oscillator 70'.

As pointed out above, actuation of channel selection switch 58 momentarily breaks the connection between leads 306 and 308 as the switch changes from one of its rest positions to the other. The resulting decrease in the DC load creates the pulse which is transmitted over lead 48 to the ADC to effect channel advance. As will be appreciated, the transition time between the two switch states determines the duration of the channel advance pulse; this is approximately 3 milliseconds for the disclosed embodiment.

Generation of the extended duration reset synchronization pulse is produced by control of the charging time of a capacitor C37 contained in reset synchronization circuit 62. The latter comprises transistor Q4 having its emitter-collector path coupled in series with leads 300 and 306 and its base connected to the collector circuit of a second transistor Q5 which operates as a control circuit for transistor Q4. The collector circuit for transistor Q5 is connected to power supply lead 300 through resistors R16 and R17; emitter bias for transistor Q5 is provided by resistors R15 and R19. The base circuit for transistor Q5 is comprised of resistor R18 and capacitor C37 previously mentioned, and a diode CR6. Also connected to the common junction of resistor R18, capacitor C37 and diode CR6 is one of the fixed terminals of reset synchronization switch 60, the moving contact being grounded. Switch 60 is illustrated in its normal condition, i.e., the condition resulting from engagement of the lower surface of display loop 88 with arm 286 of reset microswitch 284.

Under these condition, capacitor C37 is charged to a voltage slightly below the power supply level sufficient that the resulting base bias for transistor Q5 maintains the transistor in saturation. Resistors R16 and R17 are so chosen that with transistor Q5 saturated, the signal at the base of transistor Q4 is sufficiently low that the latter is also saturated. the result is a low resistance signal path through lead 300, transistor Q4, lead 306, switch 58, and lead 308 to power supply filter network 76.

As previously explained, when the end 288 of microswitch arm 386 encounters the notch in display loop 88, switch 60 is momentarily closed, causing capacitor C37 to discharge rapidly. This causes the base bias for transistor Q5 to go to zero, cutting off the transistor and increasing the voltage at the base of transistor Q4 sufficiently to cut this transistor off as well. The latter then is equivalent to an open switch disconnecting power supply lead 30 from filter network 38 in precisely the same manner as if channel advance switch 58 had been opened.

The open circuit condition for reset synchronization switch 60 only exists momentarily as the notch in the display loop passes over the arm of the reset microswitch. As soon as switch 60 reopens, capacitor C37 begins to charge through resistor R18. When the voltage across capacitor C37 reaches a level sufficient to overcome the emitter bias provided for transistor Q5 by means of resistors R15 and R19, transistor Q5 again conducts, in turn causing transistor Q4 to conduct. This returns the power supply circuit to its normal operation. As indicated by FIG. 3, the charging time of capacitor C37 in relation to the remainder of the circuit elements is such that the reset synchronization period is approximately 100 milliseconds.

As will be noted, the biasing circuitry for transistor Q5 is always connected to power supply lead 300 and thus complete removal of the DC load from lead 48 is not achieved. However, for the circuit illustrated in FIG. 13, cut-off of transistor Q4 either by the bias level at its base, or by opening channel advance switch 58 produces a voltage level of approximately 29 volts as compared to approximately an 18 volt operating level with power being supplied to filter network 76. Thus a substantial voltage difference is generated which may readily be recognized by equipment located at the ADC to achieve the desired channel advance or reset synchronization.

Another point to be noted is that switch 58 also opens briefly at approximately the same time as synchronization switch 60 is closing. However, because the transition time for switch 58 is so small in relation to the charging time of capacitor C37, the exact relationship between closure of switches 58 and 60 is of no particular concern.

As previously mentioned in connection with FIG. 13, local oscillator 70'comprises a pair of separate oscillator stages 292 and 294 selectively operated by switch 296. Thus, as illustrated in FIG. 15, a connection is provided over lead 78 from power supply filter network 76 to the moving contact of switch 296. The fixed contacts are connected by means of leads 310 and 312 to capacitors C33 and C26 of oscillator stages 292 and 294 respectively. Depending on which of the oscillators is actuated, a signal of the required frequency is provided over lead 302 to mixer 68 which converts the selected one of the incoming video signals from its sub-band to the VHF channel on which the program is to be viewed.

The construction described and illustrated in connection with FIG. 15 may also be used for the single frequency embodiment of the system described above in connection with FIG. 2, i.e., the system shown and described in the above mentioned Merrill et al. patent application. For such purpose, the only changes required are to substitute a single oscillator having the required frequency for oscillators 292 and 294 with direct connection for the substituted oscillator to the power supply rather than through switch 296. The circuitry shown in FIG. 15 may otherwise be used without change since the character of the channel advance and reset synchronization pulses is identical in both embodiments.

In the above, there has been described a simple and reliable subscriber station control unit for a cable television system which provides channel selection and reset synchronization signals and allows convenient modification of the selector mechanism to accommodate an increasing number of program channels simply by substitution of a new display loop. Further, with minimal modification the selector mechanism may be adapted to accommodate a distribution system in which one program, or in which two or more programs are carried by each distribution cable on a frequency multiplex basis.

In addition, it should be understood that several variations of the above described embodiments are possible. For example, it will be appreciated that the configuration of the drive wheel and cam segments may be subject to modification within the scope of either embodiment. Similarly, the configuration of the channel selector contacts and the manner of engagement with the drive wheel cam segments may also be varied.

Similarly, other arrangements for selectively energizing two or more local oscillators, such as a series of notches on the display strip engaging with additional spring arms may be provided. Three-frequency operation may be provided by addition of another cam surface like surfaces 172 and 174 and additional follower-microswitches.

In connection with the multiple frequency embodiment, it will be recalled that the embodiment shown provides a channel advance pulse to the area distribution center for every two detent positions of the selector mechanism. A modified arrangement, advantageous in many instances, provides a channel advance pulse to the ADC for each selector position as in the single frequency embodiment. For such an arrangement, caming surface 174 may be eliminated and camming surface 172 is extended upwardly for the entire height of intermediate portion 156 of the drive wheel 94. Both the channel advance and frequency selection microswitches then interact with camming surface 172, but construction and operation of the subscriber station equipment is not otherwise different.

Further in this connection, it will be recalled that one of the advantages of the multiple frequency arrangement is the reduction of the number of switching stages required at the area distribution center. This would still be the case with the modified multiple frequency arrangement. In order to prevent advance of the subscriber switching equipment at the area distribution center in response to each channel advance pulse, a suitable binary divider circuit would be provided, in effect, to divide by two the number of channel advance pulses.

A principal advantage of such a modified arrangement is that information would be available at the area distribution center to positively identify the particular program channel selected by the subscriber. For the embodiment in which a single channel advance pulse is provided for every two positions of the selector mechanism, the equipment at the area distribution center can determined only which of cables 42 (see FIG. 1) is connected to the subscriber's line 48 but there is no way to determine which of the channels carried by that cable is being viewed. In the modified embodiment, simply by identifying the state of the divide by two circuit, positive channel identification is provided.

The positive channel selection identification information may advantageously be used for several purposes. For example, unambiguous knowledge of the selected channel permits determination of viewer preference and/or direct billing on a program basis. Another value of positive identification of the selected channel is that this facilitates selection of channels available to particular subscribers and selective blocking out of channels not to be made available. Thus, simple logic circuitry responding to the state of the divide by two counter and the cable selection switching circuitry may readily be employed to selectively block the RF signal appearing on a particular channel to prevent transmission of such signal to any subscriber not intended to receive that material.

Further, as will be appreciated, the arrangement of the sub-channel of VHF converter may also be subject to variation. Possible modifications would include direct sub-channel to IF conversion whereby the tuner stage of the subscriber's television receiver may be bypassed, thereby avoiding adjacent channel interference in metropolitan or other areas having near capacity channel allocation. Provision of DC operating power from the ADC is also not necessary, the 60Hz power available at the subscriber location may be employed.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A control unit for a communication system having a central station and a remote station connected by a communication path, said central station having a multiple state switching mechanism associated with said remote station for selectively connecting said communication path to a plurality of communication channels in response to control signals transmitted from said remote station, said control unit comprising:

a channel selector mechanism including a housing having a rotatable drive wheel, said drive wheel carrying a camming surface including a plurality of spaced peripheral cam segments; electrical circuit means including a switch having a follower adapted to engage said cam segments as said wheel is rotated; detenting means carried in said housing and cooperable with said wheel to define a plurality of discrete rotational steps for said wheel, said follower being operable to control said circuit means to provide control signals to the central station in response to stepping of said wheel; a channel selection display means; means on said drive wheel for advancing said display means a predetermined distance for each of said steps; a second electrical circuit means, and means cooperating with said display means for operating said second electrical circuit means to provide a control signal to the central station in response to advancement of said display means a multiple of said predetermined distance.

2. A control unit as defined in claim 1 wherein said display means comprises a continuous loop of flexible material bearing spaced indicia identifying a sequence of program channels, said predetermined distance corresponding to the spacing between adjacent indicia, and said multiple of said predetermined distance corresponding to the length of said loop; said loop including a notch in one edge thereof, said actuating means for said second electrical circuit means including a switch actuating element engageable in said notch.

3. A control unit as defined in claim 1 including a manually rotatable knob; drive means connected to said knob for rotating said drive wheel in one direction, and for disengaging said knob from said drive wheel when said knob is rotated in the opposite direction.

4. A control unit as defined in claim 3 wherein said drive means comprises an element pivotally depending from said knob, said drive wheel including surfaces for engaging with one end of said element when said knob is rotated in said one direction, said element being pivotable away from said surfaces when said knob is rotated in the opposite direction.

5. A control unit as defined in claim 4 wherein said surfaces include portions of circumferentially spaced raised ribs extending generally from the central axis of said wheel, said surfaces of said ribs lying generally coincident with radii of said wheel.

6. A control unit as defined in claim 1 wherein said detenting means includes a plurality of circumferentially spaced radial projections carried by said wheel and defining recesses therebetween, a lever pivotally carried by said housing and having an element selectively engageable in said recesses to detent said wheel in predetermined circumferential positions, and means for biasing said lever in a direction to maintain said element in a wheel detenting position.

7. A control unit as defined in claim 1 wherein said display means comprises a continuous loop of flexible material bearing a plurality of spaced indicia identifying a sequence of channels, said loop including a plurality of openings spaced therealong, said drive wheel including sprocket teeth for engaging in said openings and driving said display loop.

8. A control unit as defined in claim 7 wherein the number of cam segments and steps for said drive wheel is less than the number of indicia carried by said display loop.

9. A control unit according to claim 1 wherein each channel is defined by a predetermined frequency band; and further inlcuding electrical circuit means for converting said frequency band to another frequency band, said drive wheel carrying a second camming surface including a plurality of spaced peripheral cam segments, a follower adapted to engage said second cam segments as said wheel is rotated and operable to actuate said latter electrical circuit means to convert from on frequency band to another in response to stepping of said wheel.

10. A control unit according to claim 1 wherein each channel is defined by one of two possible frequency bands and further including electrical circuit means for converting each of said first and second bands to a third band, said drive wheel carrying a second camming surface including a plurality of spaced peripheral cam segments, a follower to engage said second cam segments as said wheel is rotated and operable to actuate said electrical circuit to convert either said first or said second frequency band to said third frequency band in accordance with the position of said wheel.

11. A control unit as defined in claim 10 wherein said second cam segments are separated by a predetermined spacing such that said follower engages with successive ones of said second cam segments for every second discrete step.

12. A control unit as defined in claim 1 wherein said display means comprises a continuous loop of flexible material bearing spaced indicia identifying a sequence of program channels, a display window in said housing, and means for supporting said loop principally at its edges for movement in said housing to display said indicia through said display window.

13. A control unit for a multi-channel communication system comprising a central station and a remote station connected by a communication path, said central station having multistate switching means for selectively connecting said communication path to a plurality of communication channels under control of said remote station, said control unit being located at said remote station and comprising a channel selector mechanism; means cooperating with said channel selector mechanism for defining fixed steps through which said mechanism may be advanced; means for generating a first signal for predetermined ones of said fixed steps; a channel selection display mechanism; means cooperating with said selector mechanism to advance said display mechanism a predetermined distance for each of said fixed steps; means to generate a second signal when said display mechanism has advanced by a multiple of said predetermined distance; means adapted to provide said first and second signals on said communication path; said central station switching means being responsive to said first signal to connect a different channel to the same communication path as that on which said first and second signals are provided, and responsive to said second signal to return said switching means to a rest state with a predetermined channel connected to said communication path, each channel being defined by a predetermined frequencey band; and further including means for converting said frequency band to another frequency band, said means comprising a local oscillator, a mixer, means for coupling said communication channel to the input of said mixer, and means for coupling the output of said mixer to a utilization device.

14. A control unit as defined in claim 13 wherein said oscillator includes means for generating at least two distinct frequencies; and further including means cooperating with said channel selector mechanism for actuating said oscillator to generate one of said frequencies for each of said fixed steps.

15. A control unit for a multi-channel communication system comprising a central station and a remote station connected by a communication path, said central station having mutli-state switching means for selectively connecting said communication path to a plurality of communication channels under control of said remote station, said control unit being located at said remote station and comprising: a channel selector mechanism; means cooperating with said channel selector mechanism for defining fixed steps through which said mechanism may be advanced; means for generating a first signal for every other one of said fixed steps; a channel selection display mechanism; means cooperating with said selector mechanism to advance said display mechanism a predetermined distance for each of said fixed steps; means to generate a second signal when said display mechanism has advanced by a multiple of said predetermined distance; means adapted to provide said first and second signals on said communication path; said central station switching means being responsive to said first signal to connect a different channel to said communication path, and responsive to said second signal to return said switching means to a rest state with a predetermined channel connected to said communication path.

16. A control unit for a multi-channel communication system comprising a central station and a remote station connected by a communication path, said central station having multi-state switching means for selectively connecting said communication path to a plurality of communication channels under control of said remote station, said control unit being located at said remote station and comprising: a channel selector mechanism; means cooperating with said channel selector mechanism for defining fixed steps through which said mechanism may be advanced; means for generating a first signal for predetermined ones of said fixed steps; a channel selection display mechanism; means cooperating with said selector mechanism to advance said display mechanism a predetermined distance for each of said fixed steps; means to generate a second signal when said display mechanism has advanced by a multiple of said predetermined distance; means adapted to provide said first and second signals on said communication path; said central station switching means being responsive to said first signal to connect a different channel to said communication path, and responsive to said second signal to return said switching means to a rest state with a predetermined channel connected to said communication path; said means for generating said first signal comprising means to generate a first electrical pulse having a first duration, and said means to generate said second signal comprising means to generate a second pulse, the duration of which substantially exceeds that of said first pulse.

17. A control unit for a multi-channel communication system comprising a central station and a remote station connected by a communication path, said central station having mutli-state switching means for selectively connecting said communication path to a plurality of communication channels under control of said remote station, said control unit being located at said remote station and comprising: a channel selector mechanism; means cooperating with said channel selector mechanism for defining fixed steps through which said mechanism may be advanced; means for generating a first signal for predetermined ones of said fixed steps; a channel selection display mechanism; means cooperating with said selector mechanism to advance said display mechanism a predetermined distance for each of said fixed steps; means to generate a second signal when said display mechanism has advanced by a multiple of said predetermined distance; means adapted to provide said first and second signals on said communication path; said central station switching means being responsive to said first signal to connect a different channel to said communication path, and responsive to said second signal to return said switching means to a rest state with a predetermined channel connected to said communication path, each channel being defined by a predetermined frequency band; means for converting said frequency band to another frequency band, said means comprising a local oscillator, a mixer, means for coupling said communication channel to the input of said mixer, and means for coupling the output of said mixer to a utilization device; said oscillator including means for generating at least two distinct frequencies; and means cooperating with said channel selector mechanism for actuating said oscillator to generate one of said frequencies for each of said fixed steps; said oscillator generating one of two different frequencies for alternate ones of said fixed steps, and said first signal being generated for alternate steps of said channel selector mechanism.

18. A control unit as defined in claim 17 further including means for actuating said oscillator to generate one of two frequencies for alternate ones of said fixed steps, and wherein said first signal is generated for each step of said selector mechanism.

19. A control unit for a multi-channel communication system comprising a central station and a remote station connected by a communication path, said central station having multi-state switching means for selectively connecting said communication path to a plurality of communication channels under control of said remote station, said control unit being located at said remote station and comprising: a channel selector mechanism; means cooperating with said channel selector mechanism for defining fixed steps through which said mechanism may be advanced; means for generating a first signal for predetermined ones of said fixed steps; a channel selection display mechanism; means cooperating with said selector mechanism to advance said display mechanism a predetermined distance for each of said fixed steps; means to generate a second signal when said display mechanism has advanced by a multiple of said predetermined distance; means adapted to provide said first and second signals on said communication path; said central station switching means being responsive to said first signal to connect a different channel to said communication path, and responsive to said second signal to return said switching means to a rest state with a predetermined channel connected to said communication path; said channel display mechanism comprising a continuous loop having a plurality of spaced indicia identifying each available channel; said channel selector mechanism comprising a rotatable wheel having a first portion for engaging with and driving said siaplay loop, and a second portion comprising a plurality of spaced cam segments, and means for defining the extent of rotation of said wheel corresponding to said fixed steps of said selector mechanism; said first signal generating means including means cooperable with said cam segments to generate said first signal in response to rotation of said wheel from one step to a next step.

20. A control unit as defined in claim 19 wherein the number of fixed steps of said channel selector mechanism is less than the number of indicia on said display loop.

21. A control unit for a multi-channel communication system comprising a central station and a remote station connected by a communication path, said central station having multistate switching means for selectively connecting said communication path to a plurality of communication channels under control of said remote station, said control unit being located at said remote station and comprising: a channel selector mechanism; means cooperating with said channel selector mechanism for defining fixed steps through which said mechanism may be advanced; a first switch operated by said channel selector mechanism for predetermined ones of said fixed steps; a channel selection display mechanism; means cooperating with said selector mechanism to advance said display mechanism a predetermined distance for each of said fixed steps; a second switch operative when said display mechanism has advanced by a multiple of said predetermined distance; control circuit means for generating a first signal upon operation of said first switch and a second signal upon operation of said second switch, means adapted to provide said first and second signals on said communication path; said central station switching means being responsive to said first signal to connect a different channel to said communication path, and responsive to said second signal to return said switching means to a rest state with a predetermined channel connected to said communication path; said control circuit means including means responsive to operation of said first switch to generate a pulse as said first signal, and means responsive to operation of said second switch to generate a pulse as said second signal, the duration of said second pulse substantially exceeding that of said first pulse.

22. A control unit for a multi-channel communication system comprising a central station and a remote station connected by a DC communication path, said central station having mutli-state switching means for selectively connecting said communication path to a plurality of communication channels under control of said remote station, said control unit being located at said remote station and comprising: a channel selector mechanism; means cooperating with said channel selector mechanism for defining fixed steps through which said mechanism may be advanced; a first switch operated by said channel selector mechanism for predetermined ones of said fixed steps; a channel selection display mechanism; means cooperating with said selector mechanism to advance said display mechanism a predetermined distance for each of said fixed steps; a second switch operative when said display mechanism has advanced by a multiple of said predetermined distance; control circuit means for generating a first signal upon operation of said first switch and a second signal upon operation of said second switch, means adapted to provide said first and second signals on said communication path; said central station switching means being responsive to said first signal to connect a different channel to said communication path, and responsive to said second signal to return said switching means to a rest state with a predetermined channel connected to said communication path; said central station providing DC operating power on said communication path for portions of said remote station; said first switching means being coupled in said DC communication path, said first switch normally being conditioned to permit current flow, and operative to open said path momentarily under control of said channel selector mechanism; and said control circuit means including current control means connected to said path, said control means normally being conditioned to permit current flow and operative to open said path and to maintain the same in open condition for a predetermined period after operation of said second switch, said predetermined period substantially exceeding the duration of the momentary open circuit condition produced by the said first switch.

23. A control unit as defined in claim 22 wherein said control circuit includes timing means, operative to open said path through said current control device in response to closure of said second switch, and to maintain said path open for said predetermined period after said second switch has reopened.

24. A control unit as defined in claim 23 wherein said current control means comprises a transistor having its collector-emitter path connected in said DC communication path; and wherein said timing means includes a second transistor for controlling the base bias of said first transistor, and an RC charging circuit for controlling the base bias of said second transistor, said second switch being coupled to said charging circuit to discharge said capacitor upon closure of said second switch.

* * * * *

UNITED STATES PATENT OFFICE
CERTIFICATE OF CORRECTION

Patent No. 3,798,548 Dated March 19, 1974

Inventor(s) Paul White et al.

It is certified that error appears in the above-identified patent and that said Letters Patent are hereby corrected as shown below:

Column 1, line 56, "pluses" should read -- pulses --. Column 4, line 19, "selected system" should read -- selected channel --. Column 9, line 46, "173" should read -- 172 --. Column 10, line 36, "each" should read -- ease --. Column 16, line 3, "desire" should read -- desired --. Column 18, line 17, "the result" should read -- The result --; line 22, "386" should read -- 286 --. Column 20, line 19, "determined" should read -- determine --; line 31, "value of " should read -- value to --; line 42, "of VHF" should read -- to VHF --. Column 22, line 11, claim 9, "on" should read -- one --. Column 22, line 65, claim 13, "frequencey" should read -- frequency --.

Signed and sealed this 15th day of October 1974.

(SEAL)
Attest:

McCOY M. GIBSON JR.
Attesting Officer

C. MARSHALL DANN
Commissioner of Patents

ORM PO-1050 (10-69)

USCOMM-DC 60376-P69
U.S. GOVERNMENT PRINTING OFFICE 869-930